United States Patent [19]

Fujii

[11] 4,205,320
[45] May 27, 1980

[54] WET TYPE DIRECT IMAGE RECORDING METHOD

[75] Inventor: Tadashi Fujii, Yokohama, Japan
[73] Assignee: Ricoh Company, Ltd., Japan
[21] Appl. No.: 946,185
[22] Filed: Sep. 27, 1978
[30] Foreign Application Priority Data Sep. 30, 1977 [JP]  Japan .............................. 52-118178

[51] Int. Cl.$^2$ ............................................ G01D 15/16
[52] U.S. Cl. ................................ 346/1.1; 346/140 R; 101/DIG. 13
[58] Field of Search ............................ 346/140 R, 1; 101/DIG. 13

[56] References Cited
U.S. PATENT DOCUMENTS

| | | | |
|---|---|---|---|
| 2,558,900 | 7/1951 | Hooper | 101/DIG. 13 |
| 3,106,479 | 10/1963 | Evans | 101/DIG. 13 |
| 3,289,211 | 11/1966 | Klavsons et al. | 346/140 R |
| 3,800,699 | 4/1974 | Carley | 346/140 R X |
| 3,801,315 | 4/1974 | Gundlach et al. | 101/DIG. 13 |

Primary Examiner—George H. Miller, Jr.
Attorney, Agent, or Firm—McGlew and Tuttle

[57] ABSTRACT

A wet type direct image recording method an apparatus wherein an ink/image is formed directly on a surface treated recording material by passing the recording material between an image signal voltage applying electrode and an ink supplier device.

The surface of the ink supplier device has depressions in its surface layer, which permit capillarity of the ink, thereby the ink is held in the surface layer of the ink supplier device, and at least either of the ink and the surface layer of the ink supplier device is electrically conductive so that the ink or the ink supplier device serves as a counter electrode for the image signal voltage applying electrode.

The ink in the depressions is easily attracted electrostatically to the surface of the recording material when an electric field is formed between the image signal voltage applying electrode and the ink or the ink supplier device since the surface tension of the ink is reduced significantly by the electric field.

8 Claims, 5 Drawing Figures

WET TYPE DIRECT IMAGE RECORDING METHOD

BACKGROUND OF THE INVENTION

The present invention relates to a wet type direct recording method for recording an image information directly on a recording material, and more particularly to a wet type direct recording method in which an ink image is formed directly on a plain paper by passing the plain paper between an image signal voltage applying electrode and an ink bearing ink supplier which serves as a counter electrode, and the ink to which an image signal voltage is applied is attracted to the surface of the paper by the surface tension of the ink being reduced selectively.

The conventional wet type direct recording methods are behind the electrophotographic recording process in recording speed and image quality.

For example, in one conventional wet type direct recording method referred to as contrography which is illustrated in FIG. 1, a paper 3 which serves as a recording material is caused to pass between a development roller 1 and a printer head 2 which produces an image signal voltage so that charged colored particles dispersed in a developer liquid 4 are caused to adhere to the surface of the paper 3 electrophoretically through the meniscus 5 of the developer liquid 4, whereby an image is recorded on the paper 3. The developer liquid 4 comprises charged colored particles dispersed in an insulating carrier liquid.

In the conventional recording process, since ink images are formed by electrophoresis, the images are not formed speedily and accordingly it is difficult to attain a sufficiently high image density.

Moreover, when the content of the colored particles in the developer liquid is decreased in order to prevent background which may be caused by impregnation of the developer liquid 4 into the paper 3, the image density is disadvantageouly reduced considerably.

SUMMARY OF THE INVENTION

It is therefore a principal object of the present invention to provide an improved wet type direct recording method which permits speedy recording of images with good image qualities.

In a wet type direct recording method according to the present invention, a recording material which has been processed so as to repel an ink therefrom is caused to pass between an electrode for applying an image signal voltage to the recording material and an ink supplier member having depressions in its surface layer, in which the ink is impregnated by capillarity. The surface tension of the ink is selectively reduced significantly by an electric field formed between the electrode and the ink supplier member, so that the ink in the depressions where the electric field is applied is attracted to the surface of the recording member, whereby an ink image is formed directly on the recoreding member. In this method, the speed up of recording operation and a high image density without background and washed-out appearance are attained.

Moreover, since this recording method is a wet type recording method, a fixing process is unnecessary and an ink image is directly formed on the recording material by applying an electric field corresponding to an image signal, an intermediate medium for image formation and processes, such as development, image transfer, and cleaning are unnecessary. As a result, the recording apparatus can be made compact and at the same time, the operation reliability of the recording apparatus can be raised significantly. Furthermore, since plain paper can be employed as the recording material for use with this recording apparatus, the recording cost can be lowered in comparison with the conventional recording process.

BRIEF DESCRIPTION OF THE DRAWINGS

For a better understanding of the invention as well as the objects and other features, reference will be had to the following description which is to be read in conjunction with the drawings wherein.

DETAILED DESCRIPTION OF THE PREFERRED EMBODIMENTS

Figure 1:
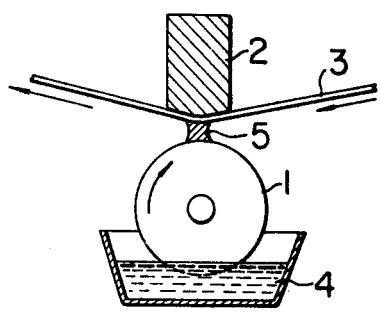
FIG. 1 is a schematic sectional side view of a recording apparatus for use in a conventional wet type direct recording method.
Figure 2:
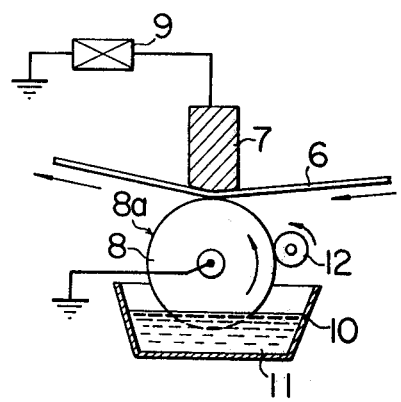
FIG. 2 is a schematic sectional side view of a recording apparatus for use in a wet type recording method according to the present invention.

Referring to FIG. 2, there is shown a development apparatus employing a wet type direct recording method according to the present invention. In the figure, a head type electrode 7 is situated above a rotatable drum type ink supplier member 8 with a small gap therebetween, and a recording material 6 is inserted into the small gap in contact with the head type electrode 7 and the drum type ink supplier member 8.

An image information signal is applied to the electrode 7 by a signal voltage generator 9 which generates the image information signal. At the same time, an ink 11 placed in a reservoir 10 adheres to the peripheral surface of the ink supplier member 8. A doctor means 12 for removing an excessive amount of the ink 11 from the peripheral surface of the ink supplier member 8 is disposed in contact with the peripheral surface of the ink supplier member 8.

The ink supplier member 8 having the ink 11 thereon constitutes a counterelectrode to work with the electrode 7 since at least either the ink supplier member 8 or the ink 11 is electrically conductive. In FIG. 2, a metallic drum which constitutes the ink supplier member 8 is grounded.

The surface layer 8a of the ink supplier member 8 is made of a hard material, such as metals and resins, and on the surface of the outer layer 8a, there are formed small depressions 8b. The depth of each depression 8b is in the range of from 30 $\mu$m to several $\mu$m, preferably from 50 $\mu$m to 300 $\mu$m. Such depressions can be formed by the conventional mechanical processing, etching process, electric surface processing or the like.

As the ink 11, a dye solution, and a suspension of pigments, such as curbon black, in a liquid can be used When necessary, (1) a surface active agent for adjusting the surface tension of the ink 11; (2) a resin agent for adjusting viscosity of the ink 11; (3) a humectant, such as glycerol and polyethylene glycol, are added to the ink 11, as in the case of ordinary inks.

As the recording material 6, a non-conductive sheet whose surface has undulation and small depressiions is employed. Ordinary plain paper with a comparatively rough surface is suitable for the recording material 6. In practice, such orindary paper is not used as it is, but it is used with its surface 6a coated or impregnated with a paper surface modifying agent so as to repel liquid therefrom. The details as to such surface modifying agents will be described later in detail.

Figure 4:
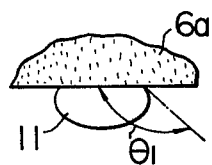
FIG. 4 is a schematic sectional view of a contact state of an ink drop with a recording material when no image signal voltage is applied in the present invention.

Such treatment is made for preventing background by modifying the surface 6a so that the surface 6a has little affinity for liquids or repels water, and more specifically by maintaining the contact angle $\theta_1$ between the surface 6a and the ink 11 at more than 90°, preferably at 120° or more as illustrated in FIG. 4 so that the ink 11 does not wet the recording material 6.

SURFACE MODIFICATION OF RECORDING MATERIAL 6

Procedure 1

The ordinary plain paper is coated or impregnated with any of the following materials, each of which is fluid insoluble in the ink 6 and evaporates slowly at room temperature: silicone oil, liquid parafin, alkyl-substituted napthalenes, alkyl-substituted diphenyls, epoxy resin, liquid polyamides, oil-modified phenolic resin, liquid rubber, and low-molecular polyester. The coating or impregnating amount of each material is not more than 5 g/m$^2$, preferably in the range of from 0.01 to 1 g/m$^2$.

Procedure 2

The ordinary plain paper is coated or impregnated with a suspension comprising any of the following resins which are insoluble in the ink 11 and which are not wetted easily by the ink 11 containing any of the following fillers: The contact ratio of each filler in each resin should be 45% or more and preferably 60% or more by weight.

Figure 3:
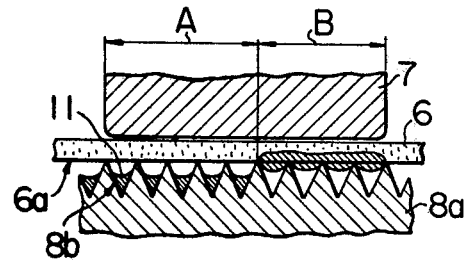
FIG. 3 is a partly sectional fragmentary schematic view of FIG. 2.

Resins: styrenated alkyd, co-polymer of styrene-methyl methacrylate-acrylic acid, fluorine-contained resin, silicone resin, blended resin of vinyl acetate resin and silicone resin, acrylic resin, polyester, polyester modified acrylic resin, alkyd modified acrylic resin, phenol modified alkyd, epoxy resin, epoxy modified alkyd Fillers: polyethylene powders, polyethylene urea powders, silica, alumina, zinc oxide, titanium dioxide, calcium carbonate, barium sulfate Hereafter, the recording operation of this embodiment employing a recording method according to the present invention will be explained. Referring to FIG. 3, the surface layer 8a of the rotatable ink supplier member 8 under a non-potential area A of the electrode 7 is impregnated with the ink 11 by capillary action occurring in the small depressions 8b formed in the surface layer 8a.

The ink 11 inside each depression does not reach the upper edge of each depression since the ink 11 at the upper edge has already been scraped by a doctor means 12 in the course of the rotation of the ink supplier member 8. Therefore, the ink 11 does not adhere to the surface 6a of the recording material 6 even if the surface layer 8a is brought into contact with the recording material 6. Furthermore, since the surface layer 6a is processed so as to repel liquid, even if the recording material 6 is brought into pressure contact with the ink supplier member 8, the ink 11 does not adhere to the recording material 6. Accordingly, the background does not appear in the recording material 6.

When an information signal corresponding to an image to be recorded is generated by the signal voltage generator 9 and is applied to the electrode 7, an electric potential corresponding to an image density is generated in the potential generating area B of the electrode 7 as shown in FIG. 3, whereby a recording electric field is formed between the electrode 7 and the ink supplier member 8 which serves as the counter electrode for the electrode 7.

By this recording electric field, a potential is induced in the ink 11, and the surface tension of the ink 11 is reduced significantly, whereby the ink 11 is easily attracted electrostatically to the recording material 6 and at the same time, the interfacial tension between the recording material 6 and the ink 11 is also reduced by the recording electric field so that the ink 11 adheres to the surface layer 6a having microscopic undulations and depressions of the recording material 6 against the liquid repelling property of the surface layer 6a, resulting in the recording material 6 being wetted by the ink 11.

Figure 5:
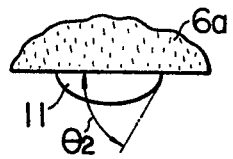
FIG. 5 is a schematic sectional view of a contact state of an ink drop with a recording material when an image signal voltage is applied in the present invention.

Thus, an ink image corresponding to the information signal is formed on the surface layer 6a of the recording material. Unlike the conventional process, in the present process, the ink image is not formed by electrophoresis. Thus, the recording speed, that is, image formation speed is very high. Moreover, since the contact angle $\theta_2$ between the recording material 6 and the ink 11 adhering to the recording material 6 is less than 90° as illustrated in FIG. 5, the ink 11 wets the surface layer 6a sufficiently so that images with high image density can be obtained and halos are not produced in solid areas.

In the present invention, the following two types of development apparatuses were employed and tested.

I. Development Apparatus Type 1

Ink Supplier Member

On the surface of a nickel-plated brass drum, a spiral groove is formed with a 20 lines/mm line density. The cross section of the groove is V-shaped and the vertical angle of each side portion of the groove is 60 degrees.

Recording Material

The surface layer of a 75 μm thick plain paper is impregnated with 0.5 g/m$^2$ of silicone oil.

Ink

Aqueous solution of Methylene Blue comprising 100 parts by weight of water and one part by weight of Methylene Blue.

By use of Development Apparatus Type 1, an an ink image was formed with a DC 400 V and 0.5 m sec/dot signal voltage applied to the electrode. As a result, a clear blue image without background was obtained.

II. Development Apparatus Type 2

Ink Supplier Member

Same as in Development Apparatus Type 1

Recording Material

The surface layer of a 75 μm thick plain paper is impregnated with 3.5 g/m$^2$ of a surface modifying agent comprising 20 parts by weight of a blended resin consisting of 70 wt% of silicone resin and 30 wt% of vinyl acetate, and 80 parts by weight of polyethylene urea.

Ink

A suspension comprising the following ingredients:
carbon black: 15 parts
polyvinyl pyrrolidone: 25 parts
acrylic resin latex emulsion: 20 parts
water: 500 parts
methylene blue: 5 parts
polyethylene glycol: 25 parts By use of Development Apparatus Type 2, an ink image was formed with a DC 600 V and 1 msec/dot signal voltage applied to the electrode. As a result, a clear back image, whose image density was in the range of 1 to 2, was obtained. The thus obtained ink image was free from background.

What is claimed is:

1. A wet type direct image recording method comprising the steps of:
   impregnating a colored liquid into a surface of a colored liquid supplier means, said surface having depressions which permits capillarity of said colored liquid, and which are distributed uniformly all over said surface, and at least either of said colored liquid and said surface being electrically conductive,
   scraping said colored liquid so as to leave it only in said depressions,
   bringing an electrically non-conductive recording material into contact with said colored liquid supplier means, the surface of said non-conductive recording material being processed so as to repel said colored liquid, and having depressions which permit capillarity of said colored liquid,
   bringing an image signal voltage applying electrode into contact with said recording material on the side opposite to that of said recording material facing said colored liquid supplier means, so as to produce an electric field corresponding to an image to be recorded, across said recording material between said electrode and said colored liquid or said colored liquid supplier means, said electric field being capable of attracting said colored liquid in said depressions to the surface of said recording material.

2. A wet type direct image recording method as claimed in claim 1, wherein the depth of said depressions formed in said colored liquid supplier means is in the range of from 30 $\mu$m to 500 $\mu$m.

3. A wet type direct image recording method as claimed in claim 1, wherein said depressions formed in said colored liquid supplier means are in the form of a spiral recess.

4. A wet type direct image recording method as claimed in claim 1, wherein said colored liquid supplier means is roller-shaped and said surface layer is formed on the peripheral surface of said colored liquid supplier means.

5. A method of recording a direct image on a recording material using an ink supplier member having a surface with a multiplicity of depressions therein which permit capillarity of a liquid ink therein and which surface is movable into and out of a liquid ink reservoir to pick up an ink supply on its surface, comprising moving the surface to pick up the ink on its surface, contacting the surface to remove the surface liquid from the outer periphery and to leave only the ink in the depressions, and contacting the recording material with the surface while subjecting the recording material to an electric field corresponding to the image to be recorded and so as to attract the liquid ink in the depressions up to the surface of the recording material.

6. A method according to claim 5, wherein a voltage is impressed on the ink supplier member and including positioning a printer head electrode on the opposite side of the recording medium from the ink supplier member so as to subject the recording material to the electric field.

7. A wet-type direct image recorder, comprising an ink supply, a movable ink supplier member having a surface with a multiplicity of depressions therein which permit capillarity of a liquid ink and being movable through said ink and away from said ink, doctor means engageable with said movable ink supplier member to remove ink from the surface of said ink supplier member leaving the ink only in the depressions thereof, a non-conductive recording material movable into contact with said movable ink supplier member and having a surface which repels said ink but having depressions in the surface thereof which capillarity of said ink, an image signal voltage applying electrode disposed to produce an electric field corresponding to the image to be recorded on said recording medium, and means for causing one of said ink supplier member and said ink to be responsive to the magnetic field to attract said ink into said depressions.

8. A wet type direct image recorder according to claim 7 wherein said ink supplier member comprises a rotatable drum rotatably mounted in said reservoir and having a surface extending out of said reservoir, said doctor blade means comprising a roller in contact with said surface as it moves upwardly from said reservoir, said recording medium being directed over the surface of said drum at a spaced location from said roller and said voltage applying electrode including a printer head located on the opposite side of said recording medium from said roller.

* * * * *